United States Patent [19]
Chang

[11] Patent Number: 5,492,746
[45] Date of Patent: Feb. 20, 1996

[54] REINFORCED TISSUE PAPER

[76] Inventor: Steve Chang, No. 1, Lane 21, Ta Tun Road, Pei Tou, Taipei, Taiwan

[21] Appl. No.: 389,737

[22] Filed: Feb. 16, 1995

[51] Int. Cl.$^6$ .................................................. B32B 3/00
[52] U.S. Cl. .............................. 428/78; 428/77; 428/43
[58] Field of Search ............................ 428/43, 78, 79; 242/1

[56] References Cited

U.S. PATENT DOCUMENTS 1,780,275  11/1930  Randerson ............................ 428/43

Primary Examiner—Alexander S. Thomas
Attorney, Agent, or Firm—Shoemaker and Mattare, Ltd.

[57] ABSTRACT

A reinforced tissue paper formed of a plurality of tissue paper layers covered together and having a top side and a bottom side, wherein a first reinforcing covering is covered on the center of the top side of the piece of tissue paper for use as a wiping surface for wiping off waste matter from the anus area, and a second reinforcing covering is covered on one part of the bottom side of the piece of tissue paper for use as a wiping surface for wiping off waste matter when the first reinforcing covering is used and the piece of tissue paper is folded up.

6 Claims, 3 Drawing Sheets

REINFORCED TISSUE PAPER

BACKGROUND OF THE INVENTION

The present invention relates to a tissue paper, and more particularly to a reinforced tissue paper which does not tear when used to wipe the anus clean.

After waste matter is discharged, tissue paper is commonly used to wipe the anus clean. While wiping off waste matter from the anus and its nearby area with a piece or pieces of tissue paper, the tissue paper tends to be pulled apart, causing the hand contaminated by waste matter. In order to eliminate this problem, more pieces of tissue paper are used each time. Therefore, most pieces of tissue paper are wasted.

SUMMARY OF THE INVENTION

The present invention has been accomplished under the circumstances in view. It is one object of the present invention to provide a reinforced tissue paper which does not tear when used to wipe the anus area clean. It is another object of the present invention to provide a reinforced tissue paper which can be fully utilized to eliminate possible waste of tissue paper.

DETAILED DESCRIPTION OF THE PREFERRED EMBODIMENTS

Figure 1:
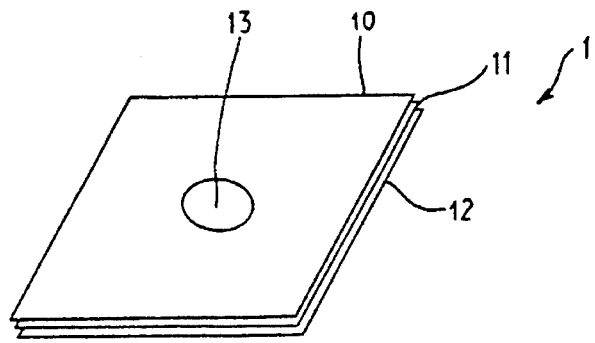
FIG. 1 is a top view in elevation of a piece of reinforced tissue paper according to the present invention.
Figure 2:
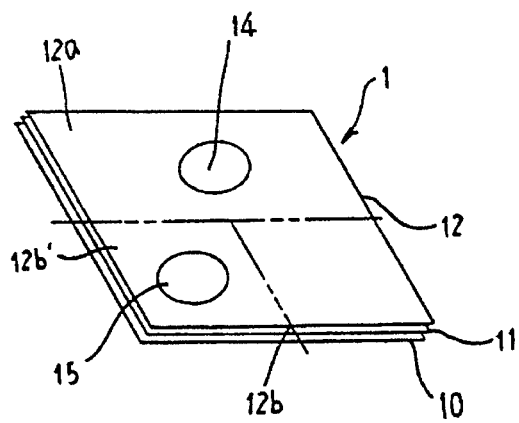
FIG. 2 is a bottom view in elevation of the piece of reinforced tissue paper shown in FIG. 1.
Figure 3:
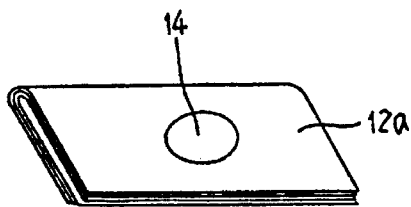
FIG. 3 is an elevational view of the piece of reinforced tissue paper shown in FIG. 1 when folded up.
Figure 4:
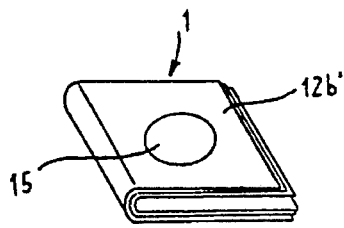
FIG. 4 shows the folded-up piece of reinforced tissue paper of FIG. 3 folded up again.
Figure 5:
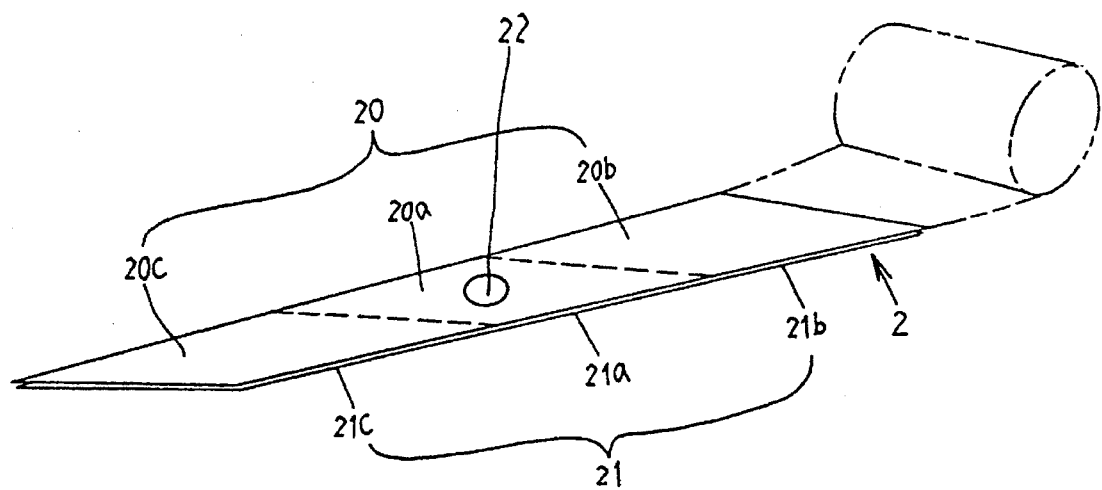
FIG. 5 shows a continuous sheet of reinforced tissue paper according to the present invention.
Figure 6:
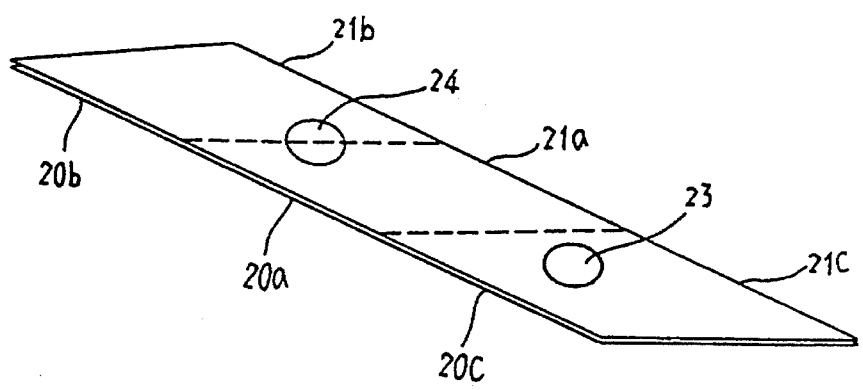
FIG. 6 shows the bottom side of one reinforced tissue paper unit cut from the continuous sheet of reinforced tissue paper of FIG. 5.

Referring to FIGS. 1, 2, 3, and 4, a piece of tissue paper 1, which can be a plain type or pop-up type, is comprised of a top layer 10, a bottom layer 12, and an intermediate layer 11 placed tightly between the top layer 10 and the bottom layer 12. The top layer 10 is covered with a first reinforcing covering 13 at the center by an adhesive agent. The first reinforcing covering 13 is made of water soluble paper of high absorbing power and structural strength that does not cause any environmental protection problem. The size of the first reinforcing covering 13 is sufficient for wiping off waste matter from the anus area, for example, of diameter 5 cm in case of circular shape. The first reinforcing covering 13 can also be made of square, polygonal or any of a variety of shapes. The bottom layer 12 is externally covered with a second reinforcing covering 14 and a third reinforcing covering 15 by an adhesive agent. The size and quality of the second reinforcing covering 14 and third reinforcing covering 15 are similar to that of the first reinforcing covering 13. The bottom layer 12 is divided into two equal halves, namely the first half 12a and the second half 12b. The second half 12b of the bottom layer 12 is then divided into two equal portions 12b'. The second reinforcing covering 14 is made at the center of the first half 12a of the bottom layer 12. The third reinforcing covering 15 is made at the center of one portion 12b' of the second half 12b of the bottom layer 12. When in use, the first reinforcing covering 13 is used as the wiping surface to wipe off waste matter from the anus area. If the anus area is not cleaned after a first wiping, the piece is of reinforced tissue paper 1 is folded up, permitting the first reinforcing covering 13 to be covered from sight, and then the second reinforcing covering 14 is used as the wiping surface to wipe off waste matter from the anus area (see FIG. 3). If the anus area is still not cleaned after a second wiping, the piece of reinforced tissue paper 1 is folded up again, permitting the first reinforcing covering 13 and the second reinforcing covering 14 to be covered from sight, and then the third reinforcing covering 15 is used as the wiping surface to wipe off waste matter from the anus area (see FIG. 4).

Figure 7:
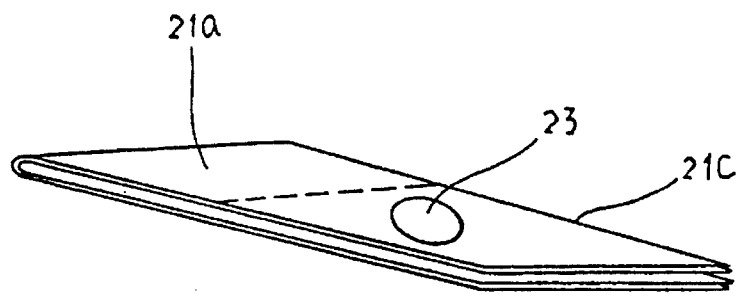
FIG. 7 shows the reinforced tissue paper unit of FIG. 6 folded up.
Figure 8:
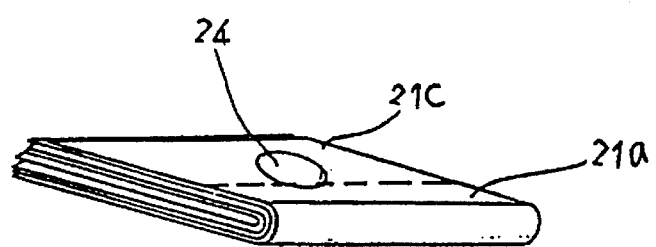
FIG. 8 shows the folded up reinforced tissue paper unit of FIG. 7 folded up again.

Figures from 5 to 8 show a continuous web of reinforced tissue paper, referenced by 2, according to the present invention. The continuous web of reinforced tissue paper 2 is comprised of reinforced tissue paper units connected in series, each reinforced tissue paper unit comprised of a top layer 20 and a bottom layer 21 covered with each other. The top layer 20 is comprised of a front portion 20c, a rear portion 20b, and an intermediate portion 20a connected in series between the front portion 20c and the rear portion 20b. The bottom layer 21 is comprised of a front portion 21c, a rear portion 21b, and an intermediate portion 21a connected in series between the front portion 21c and the rear portion 21b. A first reinforcing covering 22 is covered on the center area of the intermediate portion 20a of the top layer 20. A second reinforcing covering 23 is covered on the center area of the front portion 21c of the bottom layer 21. A third reinforcing covering 24 is covered on the folding line in the middle between the intermediate portion 21a and rear portion 21b of the bottom layer 21. When in use, the first reinforcing covering 22 is used as the wiping surface to wipe off waste matter from the anus area. If the anus area is not cleaned after a first wiping, the reinforced tissue paper unit 2 is folded up, permitting the first reinforcing covering 22 to be covered from sight, and then the second reinforcing covering 23 is used as the piping surface to wipe off waste matter from the anus area (see FIG. 7). If the anus area is still not cleaned after a second wiping, the reinforced tissue paper unit 2 is folded up again, permitting the first reinforcing covering 22 and the second reinforcing covering 23 to be covered from sight, and then the third reinforcing covering 24 is used as the wiping surface to wipe off waste matter from the anus area (see FIG. 8).

It is to be understood that the drawings are designed for purposes of illustration only, and are not intended as a definition of the limits and scope of the invention disclosed. For example, the sheet of reinforced tissue paper can be made of either two-layer or three-layer; the third reinforcing covering 15 or 24 may be eliminated; the reinforcing coverings may be made of natural or synthetic materials.

What is claimed is:

1. A tissue comprising first and second outer layers of a first tissue paper material, and first and second covering pieces of a highly absorbent second material, each of said covering pieces being smaller in area than said respective outer layers, said covering pieces being connected to said respective outer layers by an adhesive, whereby only a portion of each outer layer is covered by one of said covering pieces.

2. The invention of claim 1, wherein said first covering piece is substantially centered on said first outer layer, and said second covering piece is off center on said second outer layer.

3. The invention of claim 1, wherein the tissue is substantially square, the first covering piece is centered on the first outer layer, and the second outer layer has a first rectangular half with the second covering piece centered in it, and second rectangular half which is divided into two square quarters, with a third covering piece centered in one of said quarters, whereby a covering piece may be found centered in the tissue, regardless of whether it is unfolded, folded once, or folded twice.

4. The invention of claim 3, wherein each of said covering pieces is circular.

5. The invention of claim 1, wherein the tissue is substantially rectangular, comprising three equal portions, said first covering piece is centered on a central portion of said first layer, said second covering piece is centered on an end portion of said second layer, and further comprising a third covering piece centered on a line between two adjacent portions of said second layer.

6. The invention of claim 1, comprising a series of said tissues interconnected in a continuous web.

* * * * *